(12) United States Patent
Chen et al.

(10) Patent No.: US 7,396,130 B2
(45) Date of Patent: Jul. 8, 2008

(54) OPTICAL SYSTEM, IMAGE PROJECTION APPARATUS AND METHOD THEREOF

(75) Inventors: Yen-Chen Chen, Tainan County (TW); Kuo-Yuin Li, Tainan County (TW)

(73) Assignee: Himax Technologies, Inc., Hsinhua, Tainan County (TW)

( * ) Notice: Subject to any disclaimer, the term of this patent is extended or adjusted under 35 U.S.C. 154(b) by 185 days.

(21) Appl. No.: 11/036,979

(22) Filed: Jan. 19, 2005

(65) Prior Publication Data

US 2005/0157264 A1 Jul. 21, 2005

(30) Foreign Application Priority Data

Jan. 20, 2004 (TW) .............................. 93101492 A
Jan. 13, 2005 (TW) .............................. 94100994 A

(51) Int. Cl.
  G03B 21/14 (2006.01)
  G03B 21/20 (2006.01)
  G03B 21/26 (2006.01)
  G03B 21/28 (2006.01)
  G02F 1/1335 (2006.01)
  G02F 1/153 (2006.01)
  G02F 1/00 (2006.01)
  G02B 5/32 (2006.01)
  G02B 27/14 (2006.01)
  H04N 5/74 (2006.01)

(52) U.S. Cl. .............................. 353/31; 353/20; 353/37; 353/84; 353/99; 353/102; 349/9; 349/106; 359/15; 359/267; 359/634; 348/759

(58) Field of Classification Search ................... 353/20, 353/30, 31, 34, 37, 84, 102, 98, 99; 349/5, 349/7–9, 106; 359/15, 267, 443, 453, 456, 359/460, 634; 348/739, 744, 759
See application file for complete search history.

(56) References Cited

U.S. PATENT DOCUMENTS

| | | | | |
|---|---|---|---|---|
| 6,046,858 A | * | 4/2000 | Scott et al. | 359/634 |
| 6,076,931 A | * | 6/2000 | Bone et al. | 353/100 |
| 6,398,365 B1 | * | 6/2002 | Takahashi et al. | 353/31 |
| 6,483,613 B1 | * | 11/2002 | Woodgate et al. | 359/19 |
| 2003/0048393 A1 | * | 3/2003 | Sayag | 349/5 |

* cited by examiner

*Primary Examiner*—Rochelle Blackman
(74) *Attorney, Agent, or Firm*—Muncy, Geissler, Olds & Lowe, PLLC

(57) ABSTRACT

An image projection apparatus. The image projection apparatus comprises a light source and LCD panel. The LCD panel comprises a plurality of pixels and color filters thereon. Light from the light source is projected to the pixels along an irradiative path and the LCD panel selectively reflects the projected light in accordance with an image signal along a projective path, wherein an angle between the irradiative and projective paths exceeds 0°.

13 Claims, 5 Drawing Sheets

OPTICAL SYSTEM, IMAGE PROJECTION APPARATUS AND METHOD THEREOF

BACKGROUND

The invention relates to an optical system, and more particularly to an off-axis liquid crystal projector using a single chip.

Reflective liquid crystal display (LCD) panels have many advantages over conventional transmissive LCD panels in many aspects. As a result, there has been an increasing trend to adopt reflective LCD panels in liquid crystal projectors. For example, the aperture ratio (i.e. the ratio of area between the actual size area of a pixel and the area of that pixel that can transmit light) of a transmissive LCD panel is limited, and it is necessary to add isolating material between pixels, which can generate pixilated images. For transmissive LCD panels, it is difficult to enable display devices having high resolution and high brightness at a reasonable production cost. Reflective LCD panels achieve desired aperture ratio and adopt specular material characterized by high reflectivity. Consequently, the reflective LCD panel addresses many of the problems of the transmissive LCD panel.

FIG. 1 shows a conventional on-axis reflective projection system 100 comprising a light source 102, a polarizing beam splitter (PBS) 104, a color separator 106, a plurality of LCD panels 108, such as red, blue and green panels, and a projection lens 110. The light source 102 emits white light to the PBS 104. The PBS 104 only allows light of certain polarization therethrough and reflects light of other polarization to the color separator 106, according to a system axis 112. The color separator 106 then separates the red, blue and green components in the light and allows them to progress toward the respective red, blue and green LCD panels 108. Each LCD panel 108 is controlled by a system, such as a computer or other image source (not shown) and the reflected light from the pixels is selectively modulated to generate a light forming color image which is then reflected to the color separator 106. The color separator 106 combines incident red, green and blue light into a whole-color light and outputs it to the PBS 104 along system axis 112. PBS 104 allows only modulated light to pass to the projection lens 110, whereby the light is focused and projected onto a screen (not shown).

Another on-axis reflective projection system adopts a single chip having color filters. This type of on-axis single chip projector requires no color separator or combining unit for the single chip having color filters, but there is still a need for PBS. The on-axis single chip projector, however, still has many unsolved problems. Firstly, light reflection efficiency is reduced by the single chip having color filters and the PBS in the light path. Secondly, if the incident angle of lights to the PBS increases, there is a serious drop in transmissivity. Thirdly, skew ray caused by the PBS also reduces contrast ratio (CR).

SUMMARY

In view of the above, the object of the invention is to provide an off-axis liquid crystal projector which does not require a PBS, eliminating conventional problems accordingly.

According to one aspect of the invention, an optical system comprises a light source, a polarizer, and a reflective liquid crystal light valve with a color filter. The light source provides light to the polarizer, whereby most of the light is converted to polarized light. The polarized light is then projected to the reflective liquid crystal light valve along an irradiative path and reflected by the reflective liquid crystal light valve along a reflective path, wherein an angle between the irradiative and projective paths exceeds 0°.

According to another aspect of the invention, an image projection apparatus comprises a light source, a liquid crystal on silicon (LCOS) panel with a color filter, and a hologram disposed between the light source and the LCOS panel. Light from the light source is irradiated to the hologram along an irradiative path and therethrough to the LCOS panel. The LCOS panel then selectively reflects the light to the hologram in accordance with an image signal and the light passing through the hologram is projected along a projective path, wherein there is an angle exceeding 0° between the irradiative and projective paths.

According to another aspect of the invention, an image projection method is disclosed. The image projection method comprises irradiating light to a hologram along a irradiative path; irradiating light passing the hologram to a reflective liquid crystal light valve including a color filter; reflecting light irradiated to the liquid crystal light valve selectively to the hologram in accordance with an image signal; and projecting the light passing the hologram along a projective path, wherein an angle between the irradiative path and the projective path exceeds 0°.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention will become more fully understood from the detailed description given hereinbelow and the accompanying drawings, which are given by way of illustration only, and thus are not limitative of the present invention, and in which.

DETAILED DESCRIPTION

Figure 1:
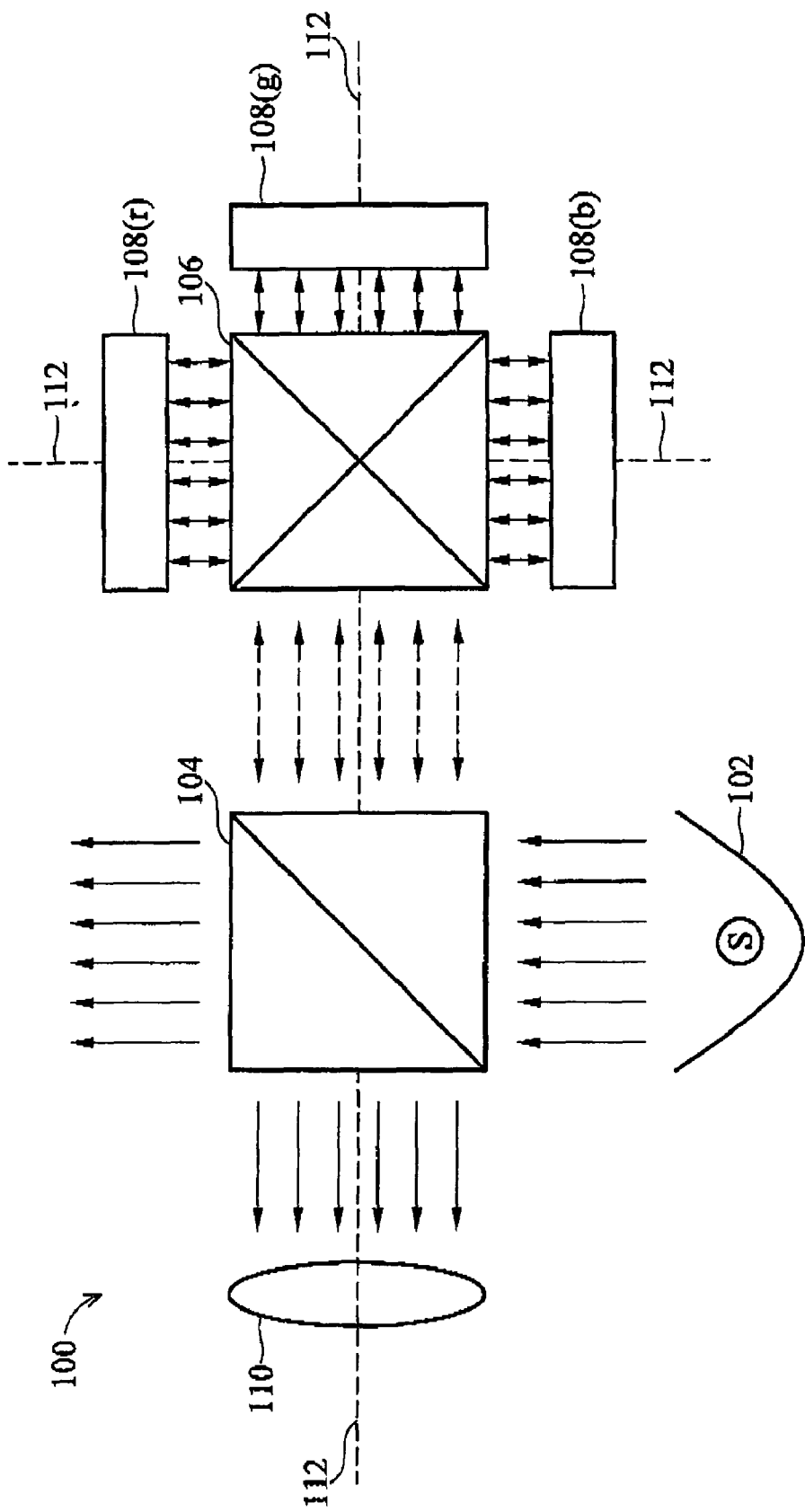
FIG. 1 is a block diagram illustrating a conventional on-axis reflective projection system.
Figure 2:
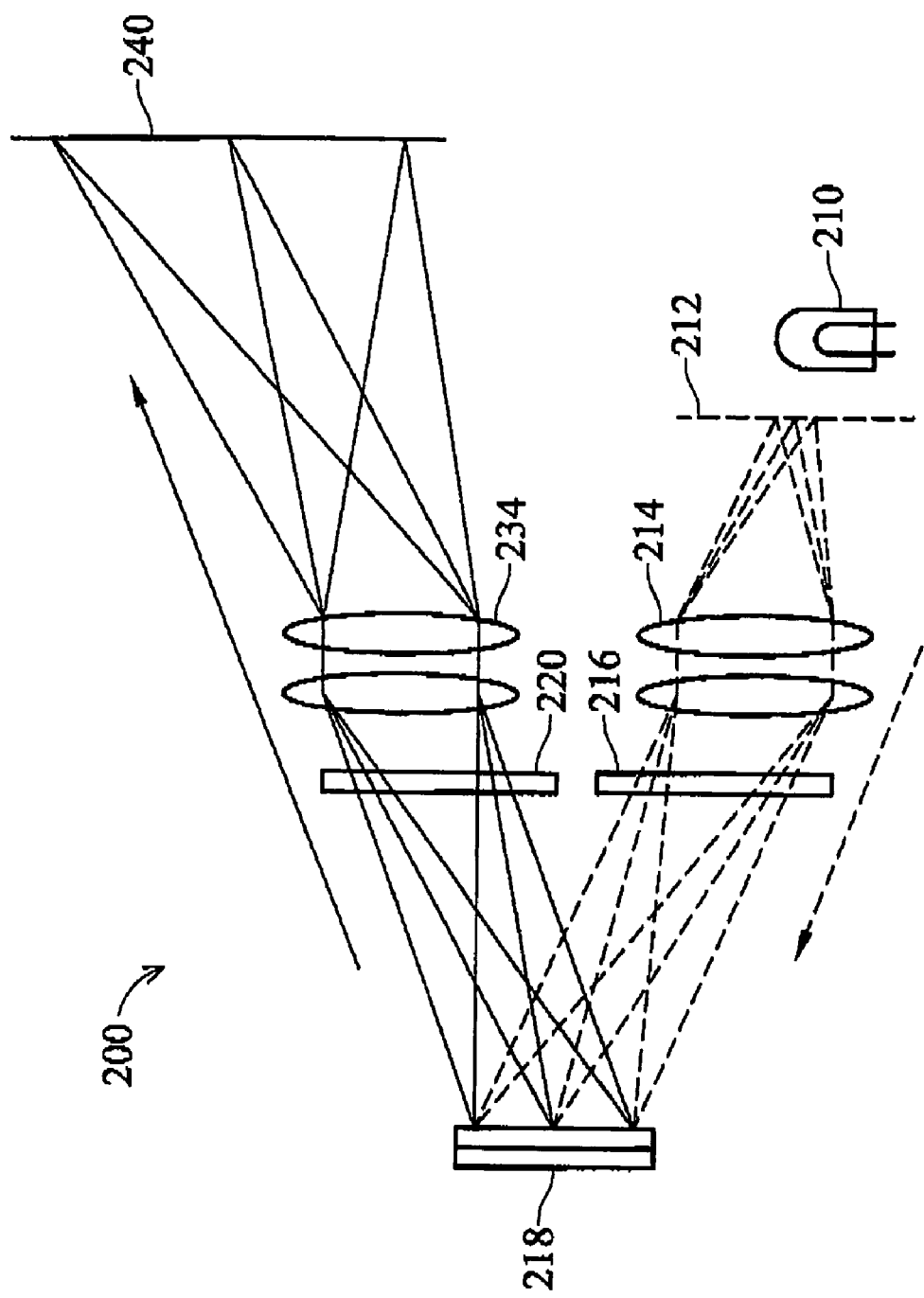
FIG. 2 is a block diagram illustrating an off-axis reflective projector using a single chip according to an embodiment of the invention.

FIG. 2 shows an off-axis reflective projector 200 using a single chip 218 according to an embodiment of the invention. The projector 200 comprises a light source 210 emitting light through an opening 212 along an irradiative path (dotted line), a condensing lens 214, and a polarizer 216. The polarizer 216 permits only P-polarized light or S-polarized light to be projected onto a reflective LCD panel 218.

The reflective LCD panel 218 reflects the light along a projective path (solid line) comprising an analyzer 220 and a projection lens 234 therein. The projective path terminates at a surface 240, such as a wall or a screen with an image determined by the reflective LCD panel 218 thereon.

The LCD panel 218 comprises an Indium Tin oxide (ITO) glass substrate, a pixel substrate and liquid crystal therebetween. A plurality of pixels is arranged in a matrix alignment on the pixel substrate with a plurality of color filters thereon. The color filters can be, for example, red, blue or green and the arrangement thereof is mosaic-type, delta-type, PenTile-type or other. The LCD panel 218 is a liquid crystal light valve, such as a liquid crystal on silicon (LCOS) panel. The LCD panel 218 selectively reflects light irradiated to the pixels in accordance with an image signal which determines the rotation angle of liquid crystal in each pixel. For example, when the LCD panel 218 is in normal black mode, the pixel therein becomes a light pixel by increased voltage level between the glass and pixel substrates while a dark pixel without increasing the voltage level.

The light source 210 can be a Cermax 500W xenon bulb or the like. The opening 212 is an input unit typically having an aperture ratio corresponding to the LCD panel 218.

The condensing lens 214 is an ordinary lens or lens system converting light from light source 210, progressing toward the LCD panel 218 via the polarizer 216. The condensing lens 214 has magnification such that the magnified area of the opening 212 is approximately equal to or greater than the area of the LCD panel 218. The characteristic of the condensing lens 214 adopted depends on different designs and should be familiar to those skilled in the art.

The light from the condensing lens 214 is projected to the LCD panel 218 via the polarizer 216. The polarizer 216 and analyzer 220 both purify polarization of light projected to the LCD panel 218 and reflected by the LCD panel 218, thereby improving the contrast of images with reduced scattered light. The polarizer 216 and analyzer 220 can be made of HN42HE polarizer manufactured by the Polaroid Corporation. Those skilled in the art will be familiar with other polarizers and analyzers to implement the described object of filtering the polarization of the reflected light from the LCD panel 218.

As shown in FIG. 2, the analyzer 220 and polarizer 216 are parallel and face the LCD panel 218. There is both an angle in the irradiative and projective paths between the hypothetical axis perpendicular to the LCD panel 218. In a preferred embodiment, a normal of the surface on which the irradiative and projective paths travel is parallel to the normal of the FIG. 2 sheet. The angles of the two paths between the hypothetical axis are both 12° such that the angle between the two paths is 24°.

Figure 3:
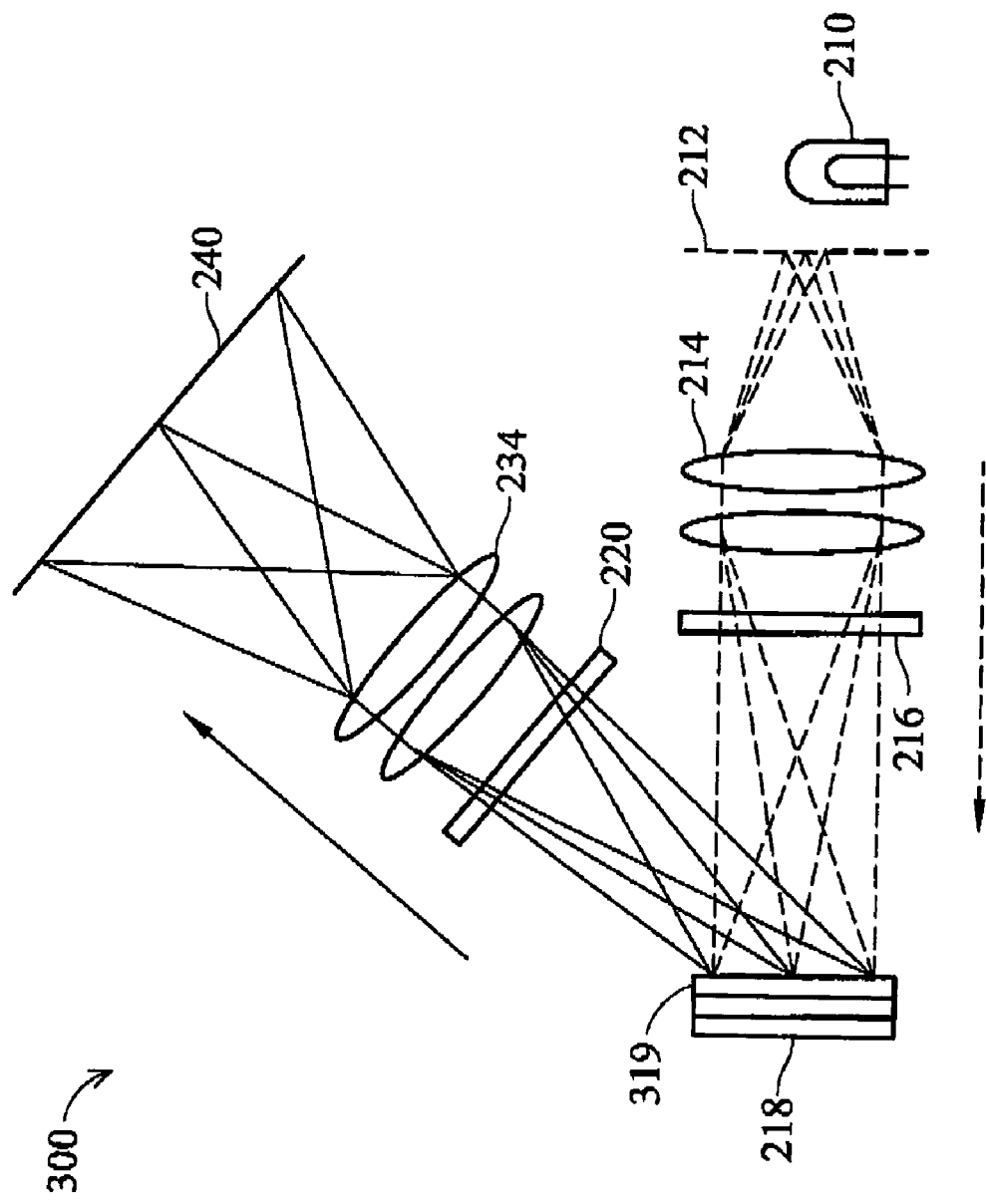
FIG. 3 is a block diagram illustrating an off-axis reflective projector using a single chip according to another embodiment of the invention.

FIG. 3 shows an off-axis reflective projector 300 using a single chip 218 according to another embodiment of the invention, units herein using the same reference numerals as those in FIG. 2 performing the same functions, and thus not described in further detail. The difference between FIG. 2 and FIG. 3 is that the off-axis reflective projector 300 further comprises a hologram 319 between the polarizer 216 and the LCD panel 218 and parallel to the LCD panel 218. The incident light perpendicular to the hologram 319 is irradiated to the LCD panel 218 at a right angle, thereby reflecting to the hologram 319 and then being diffracted by the hologram 319 in an oblique direction. Thus, angles in the irradiative and projective paths between the hypothetical axis perpendicular to the LCD panel 218 are smaller than those in FIG. 2, thus reducing size.

The hologram 319 is a holographic front diffuser manufactured by Dupont or holographic lens. The holographic lens is made of Polycarbonate (PC) or Polymethylmethacrylate (PMMA). If the hologram 319 is a holographic front diffuser, it can be attached to the LCD panel 218 directly.

Figure 4:
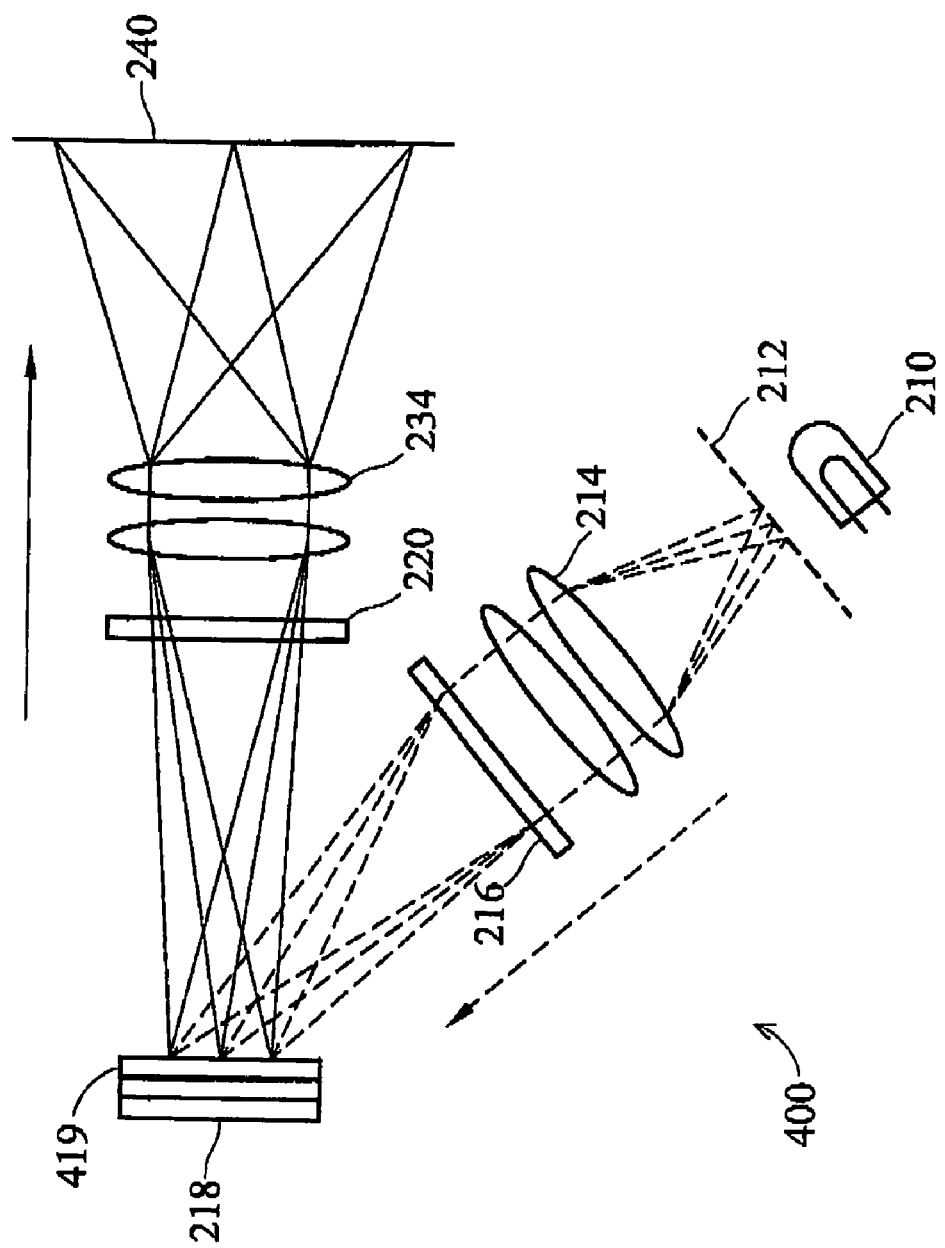
FIG. 4 is a block diagram illustrating an off-axis reflective projector using a single chip according to another embodiment of the invention.

FIG. 4 shows an off-axis reflective projector 400 using a single chip 218 according to still another embodiment of the invention, units herein using the same reference numerals as those in FIG. 2 performing the same functions, and thus not described in further detail. The difference between FIG. 2 and FIG. 4 is that the off-axis reflective projector 400 further comprises a hologram 419 between the polarizer 216 and LCD panel 218, and parallel to LCD panel 218. Incident light irradiated to the hologram 419 at an oblique angle is diffracted by the hologram 419 to the LCD panel 218 at a right angle, thereby being reflected and then irradiated by the hologram 419 at a right angle. Thus, the angles in the irradiative and projective paths between the hypothetical axis perpendicular to the LCD panel 218 are smaller than those in FIG. 2 while exceeding 0°. Size requirements for projectors are reduced because of the hologram 419.

The hologram 419 can be a holographic front diffuser manufactured by Dupont or holographic lens. The holographic lens is made of Polycarbonate (PC) or Polymethylmethacrylate (PMMA). If the hologram 419 is a holographic front diffuser, it can be directly attached to the LCD panel 218.

The difference between hologram 319 and hologram 419 is that hologram 319 allows light to be irradiated at a right angle. After reflected by the LCD panel 218 and diffracted by the hologram 319, light is irradiated obliquely. The hologram 419, however, allows light to be irradiated at an oblique angle.

After diffracted by the hologram 419 to the LCD panel 218 at a right angle and reflected by the LCD panel 218, the light is projected by the hologram 419 at a right angle.

Figure 5:
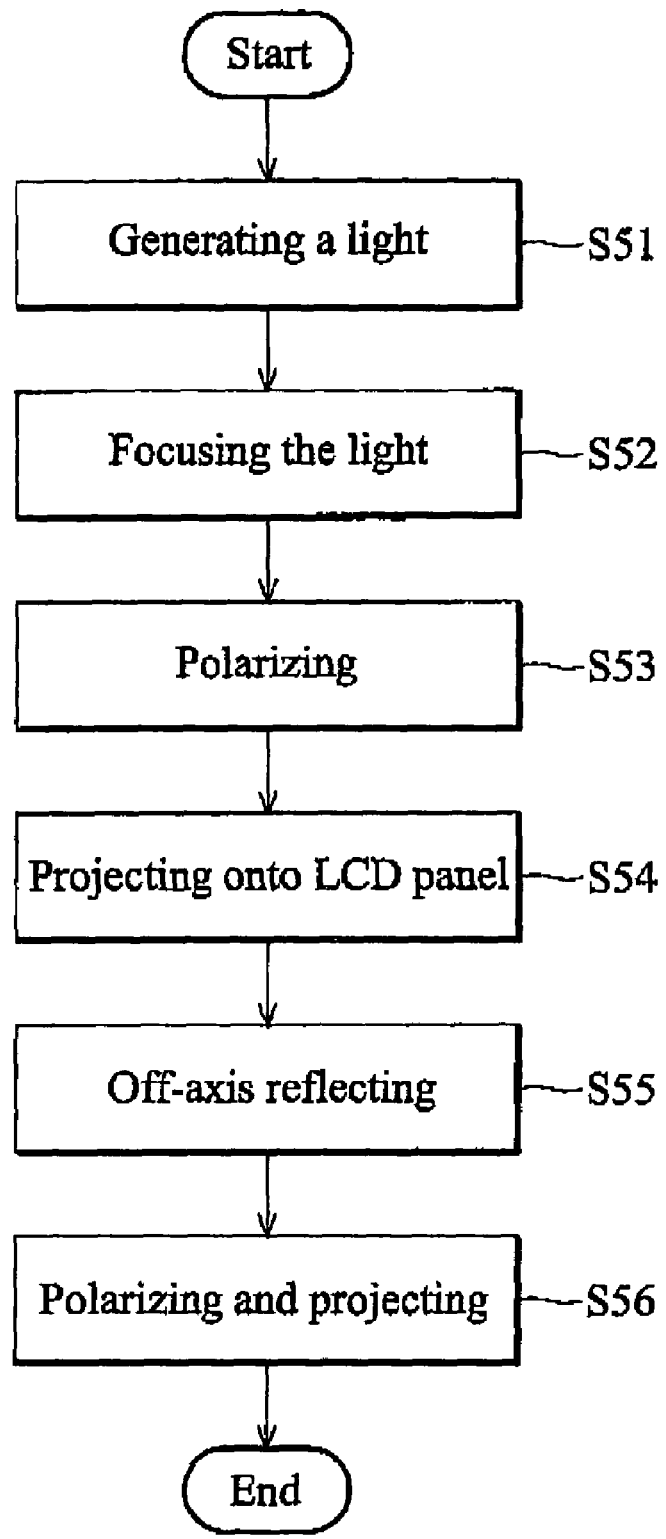
FIG. 5 is a flowchart illustrating an image projection method according to an embodiment of the invention.

FIG. 5 is a flowchart of an image projection method according to an embodiment of the invention.

In step S51, a light source emits light through an opening along an irradiative path.

In step S52, the light from the light source passes through a condensing lens, whereby light is generated along the irradiative path.

In step S53, the light from the condensing lens passes a polarizer in the irradiative path, thereby polarized, such that most of the P-polarized light or S-polarized light passes the polarizer.

In step S54, the light after polarization is projected to pixels in a LCD panel, covered by color filters. The LCD panel can be a liquid crystal on silicon (LCOS) panel.

In step S55, the light projected to the pixels in the LCD panel is selectively reflected along a projective path in accordance with an image signal, with a 24° angle between the irradiative and projective paths.

In step S56, light reflected by the LCD panel is polarized by an analyzer in the projective path and projected by a projection lens onto a screen.

Thus, the invention provides an off-axis liquid crystal projector using a single chip, wherein the projective and irradiative paths are separated by an angle. Consequently, there is no need for a PBS, eliminating problems incurred thereby.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An image projection apparatus comprising:
a light source;

a liquid crystal on silicon (LCOS) panel with a color filter; and a hologram disposed between the light source and the LCOS panel, wherein light from the light source is irradiated to the hologram along an irradiative path and there through to the LCOS panel, the irradiative path is perpendicular to the hologram, and thereby light is irradiated to the hologram at a 90° angle, the LCOS panel then selectively reflecting the light to the hologram in accordance with an image signal and the light passing the hologram projecting along a projective path, such that an angle between the irradiative path and the projective path exceeds 0°.

2. The image projection apparatus of claim 1, wherein the projective path is perpendicular to the hologram, and thereby light is projected by the hologram at a 90° angle.

3. The image projection apparatus of claim 1, wherein the hologram is holographic front diffuser or holographic lens.

4. The image projection apparatus of claim 1, wherein the color filter is selected from the group consisting of red, green, and blue color filters.

5. The image projection apparatus of claim 1, wherein the color filter is in mosaic-type, delta-type or PenTile-type arrangement.

6. The image projection apparatus of claim 1, further comprising:

a polarizer disposed in the irradiative path; and an analyzer disposed in the projective path.

7. The image projection apparatus of claim 6, further comprising:

a condensing lens disposed in the irradiative path and between the polarizer and the light source; and a projection lens disposed in the projective path.

8. The image projection apparatus of claim 7, further comprising a screen disposed in the projective path, wherein the projection lens is disposed between the analyzer and the screen.

9. An image projection method comprising:

irradiating light to a hologram along an irradiative path, wherein the irradiative path is perpendicular to the hologram, and thereby light is irradiated to the hologram at a 90° angle;

polarizing the light irradiated to the hologram;

focusing the light along the irradiative path before polarization by a condensing lens;

irradiating light passing the hologram to a reflective liquid crystal light valve including a color filter;

reflecting light irradiated to the liquid crystal light valve selectively to the hologram in accordance with an image signal; and projecting the light passing the hologram along a projective path, wherein an angle between the irradiative path and the projective path exceeds 0°.

10. The image projection method of claim 9, wherein the projective path is perpendicular to the hologram, and thereby light is projected by the hologram at a 90° angle.

11. The image projection method of claim 9, wherein the color filter is selected from the group consisting of red, green, and blue color filters.

12. The image projection method of claim 9, further comprising:

polarizing the light projected by the hologram.

13. The image projection method of claim 12, further comprising:

projecting the light onto a screen by a projection lens in the projective path after the light is polarized.

* * * * *